United States Patent [19]
Lorenzini et al.

[11] 3,727,371
[45] Apr. 17, 1973

[54] TRAY LOADING AND INDEXING MECHANISM

[75] Inventors: Raymond Lorenzini; Thomas L. Vieira; Robert G. Wallace, all of Rochester, N.Y.

[73] Assignee: Eastman Kodak, Rochester, N.Y.

[22] Filed: Nov. 12, 1971

[21] Appl. No.: 198,358

[52] U.S. Cl. ..........................53/246, 53/160, 53/163
[51] Int. Cl. .......................B65b 5/06, B65b 35/30
[58] Field of Search........................53/160, 163, 166, 53/241, 245, 246, 255; 214/310

[56] References Cited

UNITED STATES PATENTS

| | | | |
|---|---|---|---|
| 2,919,529 | 1/1960 | Hillman | 53/163 X |
| 2,933,872 | 4/1960 | Pollmann | 53/246 X |
| 3,672,118 | 6/1972 | DeJong et al. | 53/163 X |

*Primary Examiner*—Robert L. Spruill
*Attorney*—William T. French et al.

[57] ABSTRACT

A tray loading and indexing mechanism for successively loading one or more articles into each compartment of a tray having a plurality of adjacent compartments. The loading and indexing mechanism has an elevator bar that is movable in a substantially rectangular path, and during such movement loads one or more articles into one compartment at a loading station, and then indexes the tray one compartment space to position the adjacent empty compartment at the loading station.

8 Claims, 3 Drawing Figures

RAYMOND LORENZINI
THOMAS L. VIEIRA
ROBERT G. WALLACE
INVENTORS

ATTORNEY

RAYMOND LORENZINI
THOMAS L. VIEIRA
ROBERT G. WALLACE
INVENTORS

TRAY LOADING AND INDEXING MECHANISM

BACKGROUND OF THE INVENTION

1. Field of the Invention

This invention relates generally to article handling apparatus, and more specifically to a tray loading and indexing mechanism.

2. Description of the Prior Art

Article loading and/or unloading mechanisms are known in the art having an elevator mechanism for engaging an article and moving it into or out of a compartment or receptacle. Article loading and/or unloading mechanisms of this general type may employ bars that pass downwardly or upwardly through elongated slots in the bottom of a box for respectively lowering or raising articles into or out of the box. In all of such mechanisms, a separate box indexing mechanism is employed for indexing the box in synchronism with the loading and/or unloading mechanisms.

SUMMARY OF THE INVENTION

This invention includes within its scope a tray loading and indexing mechanism for successively loading an article into one compartment of a compartmented tray at a loading station, and then indexing the tray to advance an adjacent empty compartment into register with the loading station. This loading and indexing mechanism performs the dual function of of loading one compartment of a tray, and indexing the tray for advancing an adjacent empty compartment into position to be loaded. Heretofore, separate mechanisms have been provided for achieving these two functions.

In a preferred embodiment of the invention, the loading and indexing mechanism comprises an elevator bar having an initial normal position at the loading station in which the bar extends through a slotted opening in the bottom of a tray into one of the compartments to form a support for articles fed thereon by any suitable means such as a star wheel. After one or more articles are fed onto the bar at the loading station, the loading and indexing mechanism is operated through one cycle of operation causing the elevator bar to move in a substantially closed rectangular path through four steps. In the first step, the bar moves downwardly in a vertical plane from its initial position to a retracted position clear of the tray, and during such step lowers the articles into the compartment. In the second step, the bar is moved horizontally an increment equal to the pitch of a tray compartment and into register with a slotted opening in an adjacent compartment. In the third step, the bar is moved vertically upwardly into the adjacent compartment. In the last step, the bar while in the adjacent compartment is returned to its initial position advancing the tray one increment so that the adjacent empty compartment is now in alignment with the loading station. This cycle of operation is repeated until all of the compartments of the tray are filled. The movement of the elevator bar through its substantially rectangular path of movement is preferably achieved by known fluid cylinders controlled by fluid solenoid valves operated in timed relation by any suitable logic system including electrical timing units. The fluid solenoid valves are operated by microswitches preferably actuated by movable parts of the loading and indexing mechanism.

Although the elevator mechanism is shown as movable in a substantially rectangular path from an initial position at the loading station in which the elevator bar extends into one of the compartments, it is of course within the scope of the invention to include a loading mechanism in which the elevator bar in its initial position at the loading station is above an empty compartment with an article releasably supported from the under side of the bar and interposed between the bar and compartment. When the bar is operated through a four step cycle of operation, it moves one step vertically downwardly from its initial position entering the compartment and transporting the article into the compartment. The bar then moves horizontally a second step equal to a tray compartment advancing the next adjacent empty compartment into register with the loading station. The bar moves vertically upwardly a third step out of the compartment and clear of the tray. In the fourth step, the bar is returned in a horizontal direction to its initial position at the loading station.

An object of the present invention is to provide a loading and indexing mechanism for a compartmented tray for performing the dual function of loading a compartment of the tray, and indexing the tray to advance the next adjacent empty compartment into register with the loading station.

Another object of the invention is to provide a tray loading and indexing mechanism that is of simple design and construction, thoroughly reliable and efficient in operation and economical to manufacture.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because article handling mechanisms are well known, the present description will be directed in particular to elements forming part of, or cooperating more directly with, the present invention. Elements of article handling mechanisms not specifically shown or described herein should be understood to be selectable from those known in the art.

Figure 1:
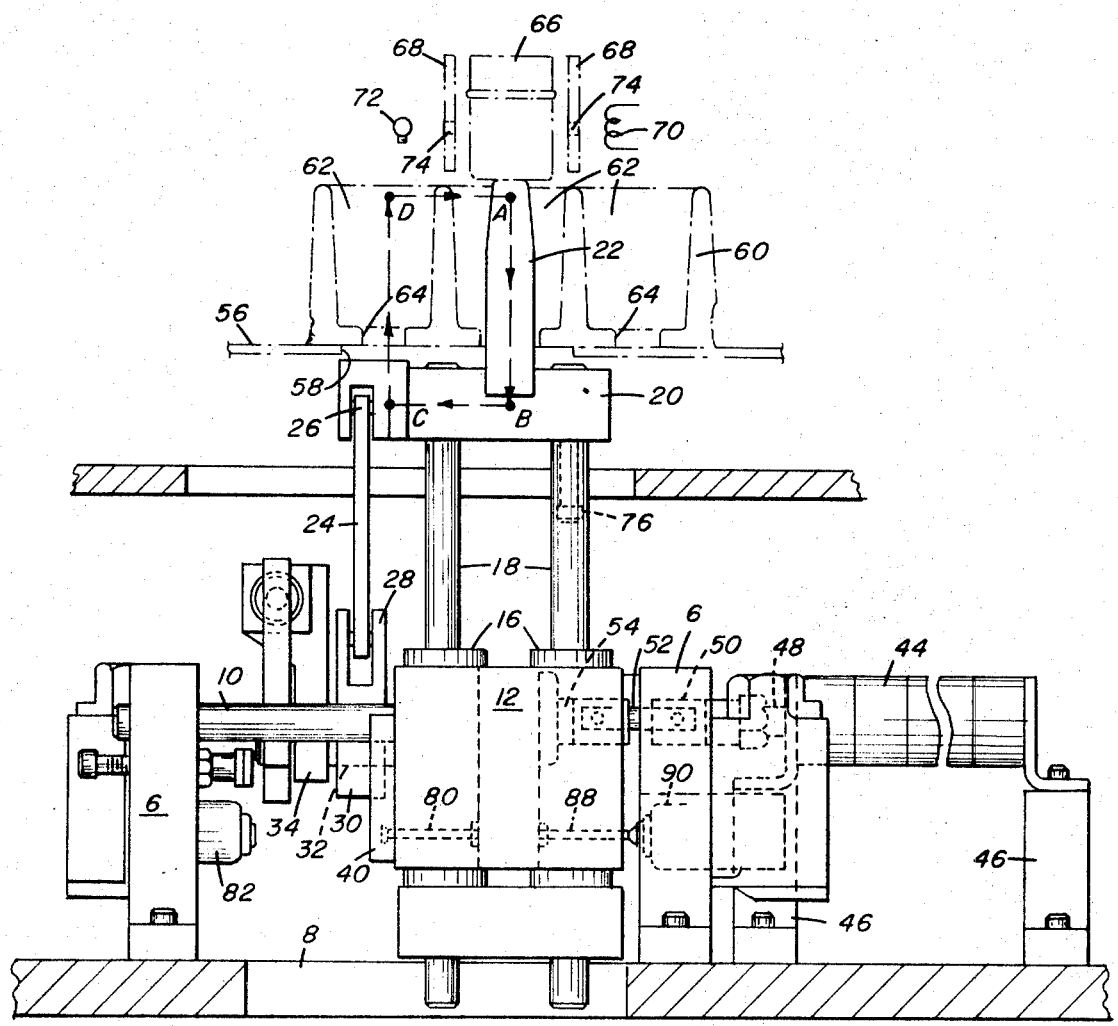
FIG. 1 is a front elevational view partially in section of a preferred embodiment of the tray loading and indexing mechanism of this invention.
Figure 2:
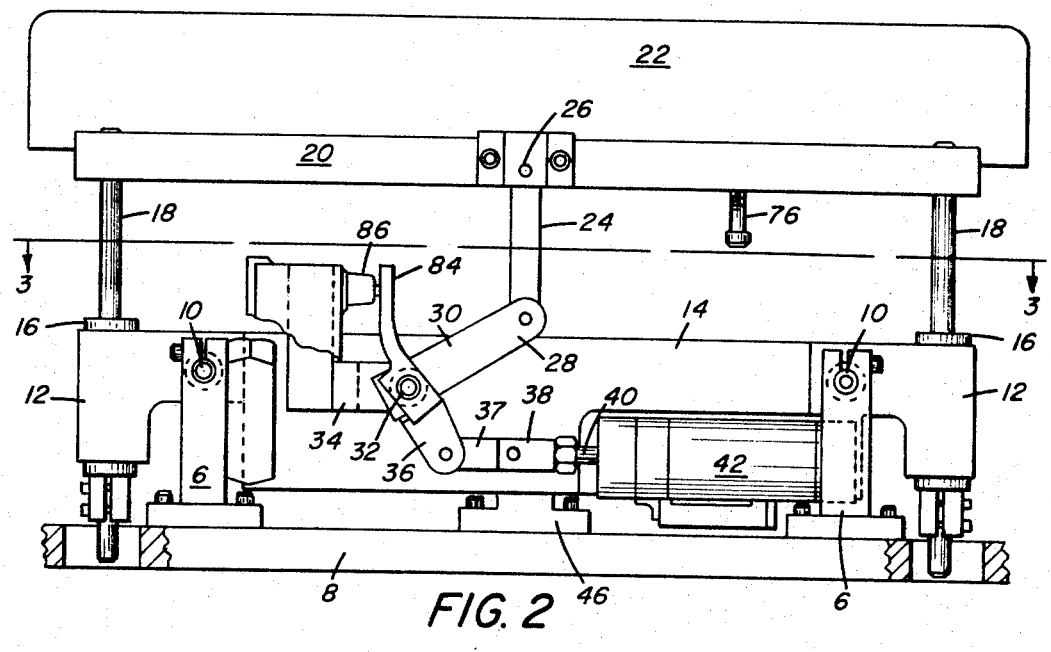
FIG. 2 is a side elevational view of the mechanism of FIG. 1 with the tray and loading station omitted for purposes of clarity.
Figure 3:
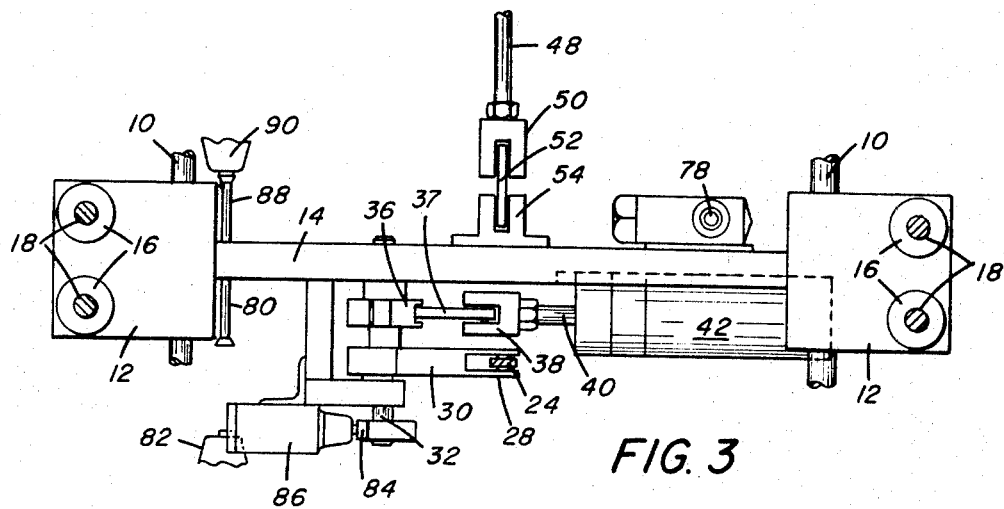
FIG. 3 is a section view taken substantially along line 3—3 of FIG. 2.

With reference to the drawings, a pair of spaced side frames 6 (FIGS. 1 and 2) are secured to a base 8 adjacent each end thereof for supporting the ends of a pair of parallel shafts 10. The shafts 10 slidably support a pair of mounting blocks 12 (FIGS. 2 and 3) joined together by a support bar 14, each block having a pair of vertically extending bearings 16 for axially supporting guide shafts 18 for reciprocal movement in a vertical direction. The upper ends of shafts 18 are secured to an elongated support plate 20 to which a vertically extending elevator bar 22 is secured by any suitable means such as bolts. Vertical movement is imparted to the elevator bar 22 through a lifting link 24 having one end 26 pivotally connected to bar 20, and its opposite end pivotally connected to the bifurcated end 28 of a lever 30 secured to a shaft 32. The shaft 32 is journaled for rotation within support bar 14, and an L-shaped bracket 34 secured to support bar 14 (FIG. 3). Another lever 36 (FIGS. 2 and 3) is secured to shaft 32, and has its free end pivotally connected to one end of a link 37, the other end of which is pivotally secured by a clevis 38 to a cylinder rod 40 of any conventional fluid cylinder 42 mounted on support bar 14. Operation of fluid cylinder 42 causes rod 40 to move in either direction in a horizontal plane which through the linkage 24, 30, 36 and 37 moves elevator bar 22 in either direction in a vertical plane by virtue of guide shafts 18. Reciprocal movement of support and elevator bars 14, 22 respectively as a unit in a horizontal direction transverse to guide shafts 18 is achieved as best seen in FIGS. 1 and 3 by another conventional fluid cylinder 44 secured to base 8 by brackets 46, and having a cylinder rod 48 secured by a clevis 50 and link 52 to yoke 54 secured to support bar 14. Operation of fluid cylinder 44 by any suitable fluid solenoid valve moves the support and elevator bars 14, 22 on shafts 10 in either direction of movement in a horizontal plane.

Fixedly mounted by conventional means (not shown) in a horizontal plane slightly above elevator bar 22, when the latter is in its lowermost position, is a tray support plate 56 (FIG. 1) having an opening 58 therein through which elevator bar 22 may be vertically moved. A tray 60, only a part of which is shown in FIG. 1 in phantom, is of a conventional type having a plurality of uniformly spaced elongated compartments 62, each adapted to receive a predetermined number of articles 66 therein. Tray 60 is further provided with an elongated slot 64 at the base of each compartment through which elevator bar 22 may be vertically moved. The tray 60 is placed by the operator on plate 56 and is positioned by any suitable retractable stop means, not shown, with the leading slot 64 in register with elevator bar 22. When the elevator bar is at the loading station in its normal initial position as seen in FIG. 1, the upper portion thereof extends slightly above the compartment walls of tray 60, and forms a support for a plurality of articles such as film magazines 66 which are fed between a pair of guide rails 68 onto the top surface of elevator bar 22. The magazines 66 rest by gravity on elevator bar 22, and when the bar is moved vertically downwardly one step from a theoretical point A on the bar (FIG. 1) to point B, magazines 66 are lowered into a compartment 62, and the upper end of bar 22 is retracted clear of tray 60.

The elevator bar 22 for each cycle of operation is moved through the generally rectangular path A, B, C, and D for lowering the magazines 66 into a compartment 62, and then indexing tray 60 one compartment space to bring the next adjacent empty compartment 62 into register with the magazines 66 at the loading station. The repetitive movement of elevator bar 22 through continuing cycles of operation is achieved by any conventional logic system including timing units operable in conjunction with microswitches actuatable by movement of the support and elevator bars 14, 22 respectively as set forth below. The operation of elevator bar 22 through a cycle of operation is initiated at the loading station by any suitable photocell 70 or any other suitable sensing mechanism for sensing the loaded condition of the elevator bar. The magazines 66 are normally fed one at a time by any suitable feed mechanism such as a star wheel (not shown), and when the leading magazine reaches the opposite end of elevator bar 22 indicating that a full load of magazines have been fed thereon, the leading magazine 66 interrupts a light beam passing from a lamp 72 through openings 74 in the guide rails onto photocell 70. The photocell 70 actuates any suitable mechanism for stopping further feed of magazines 66 onto support bar 22. The photocell 70 by conventional circuitry (not shown) further actuates a fluid solenoid valve (not shown) causing cylinder 42 to move elevator bar 22 vertically downwardly from position A to lower the magazines into the aligned compartment of tray 60. Downward movement of bar 22 continues until an adjustable stud 76 (FIGS. 1 and 2) actuates a microswitch 78 (FIG. 3) which actuates the solenoid valve to discontinue movement of the piston of cylinder 42 at which time the bar 22 will be at position B, clear of tray 60. The microswitch 78 further actuates a solenoid valve for fluid cylinder 44 causing support, and elevator bars 14, 22 respectively to be moved as a unit in a horizontal direction from point B to point C. When point C is reached, an adjustable stud 80 (FIG. 3) actuates a microswitch 82 which actuates the solenoid valve for discontinuing fluid flow to cylinder 44. The microswitch 82 further actuates the solenoid valve for cylinder 42 to reverse the flow of fluid to the cylinder causing elevator bar 22 to be moved in a vertical direction from position C to position D. Such movement causes elevator bar 22 to pass through slot 64 in the adjacent empty compartment 62. When elevator bar 22 reaches position D, an actuator arm 84 (FIGS. 1 and 2) secured to shaft 32 actuates a microswitch 86 secured to bracket 34 discontinuing further flow to cylinder 42, and actuating a solenoid valve for introducing fluid into cylinder 44 in a reverse direction for moving support and elevator bars 14, 22 respectively as a unit in a horizontal direction from position D to initial position A. Because of the engagement of bar 22 with the edge of the slot 64, such action causes tray 60 to be indexed one compartment to bring the empty compartment now into register with the magazines 66 at the loading station. When elevator bar 22 reaches position A an adjustable arm 88 secured to bar 14 actuates a microswitch 90 mounted on frame 6 for actuating the solenoid valve to discontinue fluid flow to cylinder 44. The loading and indexing mechanism is again in its initial normal position for receiving another load of magazines 66. When a full load is again fed onto elevator bar 22, photocell 70 is again actuated to discontinue further feeding of magazines onto the bar and for initiating another cycle of operation.

The invention has been described in detail with particular reference to a preferred embodiment thereof, but it will be understood that variations and modifications can be effected within the spirit and scope of the invention as described hereinabove.

We claim:

1. In a loading and indexing mechanism for successively loading articles into the compartments of a tray having a plurality of uniformly spaced adjacent compartments, the combination comprising:

means supporting said tray for generally horizontal indexing movement relative to said mechanism;

article engaging means movable in a closed path from an initial position in vertical alignment with a first compartment of said tray downwardly in one direction for loading said first compartment, then laterally in one direction into alignment with an adjacent compartment then upwardly, and then laterally in the opposite direction into said initial position;

said article engaging means being further arranged to engage the tray and index the tray one compartment during movement in one of said lateral directions; and means for cyclically moving said article engaging means through said rectangular path.

2. The invention according to claim 1 wherein said article engaging means comprises a bar reciprocally movable vertically out of said first compartment and into said adjacent compartment.

3. The invention according to claim 1 wherein said article engaging means comprises an elevator bar, and said moving means comprises a support block for guiding said elevator bar for reciprocal vertical movement, and means for mounting said support block for reciprocal lateral movement.

4. The invention according to claim 3 and further comprising means for imparting reciprocal vertical movement to said elevator bar, and means for imparting reciprocal lateral movement to said support block in timed relation to said vertical movement imparting means.

5. In a loading and indexing mechanism for successively loading at a loading station articles into the compartments of a tray having a plurality of uniformly spaced adjacent compartments, each compartment having an elongated slot in the bottom and being open at the top, the combination comprising:

means supporting the tray for generally horizontal indexing movement relative to said mechanism;

article engaging elevator means movable in a substantially closed path from an initial position at said loading station in which a portion of said elevator means extends into a first one of the compartments, downwardly one step for loading the first compartment and moving said portion of said elevator means clear of the tray, then laterally a second step in one direction into alignment with an adjacent second compartment, then upwardly a third step for moving said portion of said elevator means into said second compartment, and then laterally a fourth step in the opposite direction into said initial position and during each step bringing said second compartment into alignment with said loading station; and means for cyclically moving said article engaging means through said closed path.

6. The invention according to claim 5 wherein said article engaging elevator means comprises a bar reciprocally movable out of said first compartment through said elongated slot in the bottom during said one step, and into said second compartment during said third step.

7. The invention according to claim 5 wherein said article engaging means comprises an elevator bar, and said moving means comprises a support block for guiding said elevator bar for reciprocal vertical movement, and means for mounting said support block for reciprocal horizontal movement.

8. The invention according to claim 7 and further comprising means for imparting reciprocal vertical movement to said elevator bar, and means for imparting reciprocal horizontal movement to said support block in timed relation to said vertical movement imparting means.

* * * * *

PO-1050
(5/69)

UNITED STATES PATENT OFFICE
CERTIFICATE OF CORRECTION

Patent No. 3,727,371      Dated April 17, 1973

Inventor(s) Raymond Lorenzini, Thomas L. Vieira and Robert G. Wallace

It is certified that error appears in the above-identified patent and that said Letters Patent are hereby corrected as shown below:

Column 5, line 20, delete "rectangular" and insert --closed--.

Signed and sealed this 14th day of May 1974.

(SEAL)
Attest:

EDWARD M. FLETCHER, JR.
Attesting Officer

C. MARSHALL DANN
Commissioner of Patents